(12) United States Patent
Morel

(10) Patent No.: US 6,823,008 B2
(45) Date of Patent: Nov. 23, 2004

(54) VIDEO BITRATE CONTROL METHOD AND DEVICE FOR DIGITAL VIDEO RECORDING

(75) Inventor: Anthony Morel, Xi'an (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 537 days.

(21) Appl. No.: 09/972,588

(22) Filed: Oct. 5, 2001

(65) Prior Publication Data

US 2002/0085634 A1 Jul. 4, 2002

(30) Foreign Application Priority Data

Oct. 10, 2000 (EP) .............................................. 00402792

(51) Int. Cl.$^7$ ................................................ H04N 7/12
(52) U.S. Cl. ................................................ 375/240.03
(58) Field of Search .......................... 341/67; 348/700; 375/240.02–240.07, 240.12–240.16, 240.24; H04N 7/12, 7/24

(56) References Cited

U.S. PATENT DOCUMENTS

| | | | | |
|---|---|---|---|---|
| 5,606,371 A | * | 2/1997 | Gunnewiek et al. | ... 375/240.03 |
| 5,631,644 A | * | 5/1997 | Katata et al. | .................. 341/67 |
| 6,100,940 A | * | 8/2000 | Dieterich | ..................... 348/700 |
| 6,539,124 B2 | * | 3/2003 | Sethuraman et al. | ... 375/240.03 |
| 6,570,922 B1 | * | 5/2003 | Wang et al. | ........... 375/240.12 |

FOREIGN PATENT DOCUMENTS

| | | | | |
|---|---|---|---|---|
| EP | 0655867 AA | 11/1994 | ............ | H04N/7/50 |
| EP | 0660612 A2 | 12/1994 | ............ | H04N/7/24 |
| EP | 001005232 A2 | * 5/2000 | | |
| WO | WO 9949664 | 9/1999 | ............ | H04N/7/50 |

* cited by examiner

Primary Examiner—Richard Lee

(57) ABSTRACT

A video bitrate control method for a video coding system, the coding system generating coded video frames to be stored in a storage device and originating from a sequence of input frames, the method comprising at least a quantization step for applying to the input frames a quantization factor issued from an evaluation step. The evaluation step uses statistics relative to previous coded frames to evaluate a complexity of the current frame to be coded. In parallel, a current bit target for the frame being coded is estimated in relation to the remaining space available in the storage device and the remaining number of frames to be coded in the sequence. Then the quantization factor is derived on the basis of the estimated complexity and the estimated current bit target. This results in an output bitrate for coded frames having CBR or VBR behaviors, leading to a constant quality of the coded video frames, while guaranteeing an optimal filling of the storage device.

9 Claims, 3 Drawing Sheets

VIDEO BITRATE CONTROL METHOD AND DEVICE FOR DIGITAL VIDEO RECORDING

FIELD OF THE INVENTION

Figure 1:
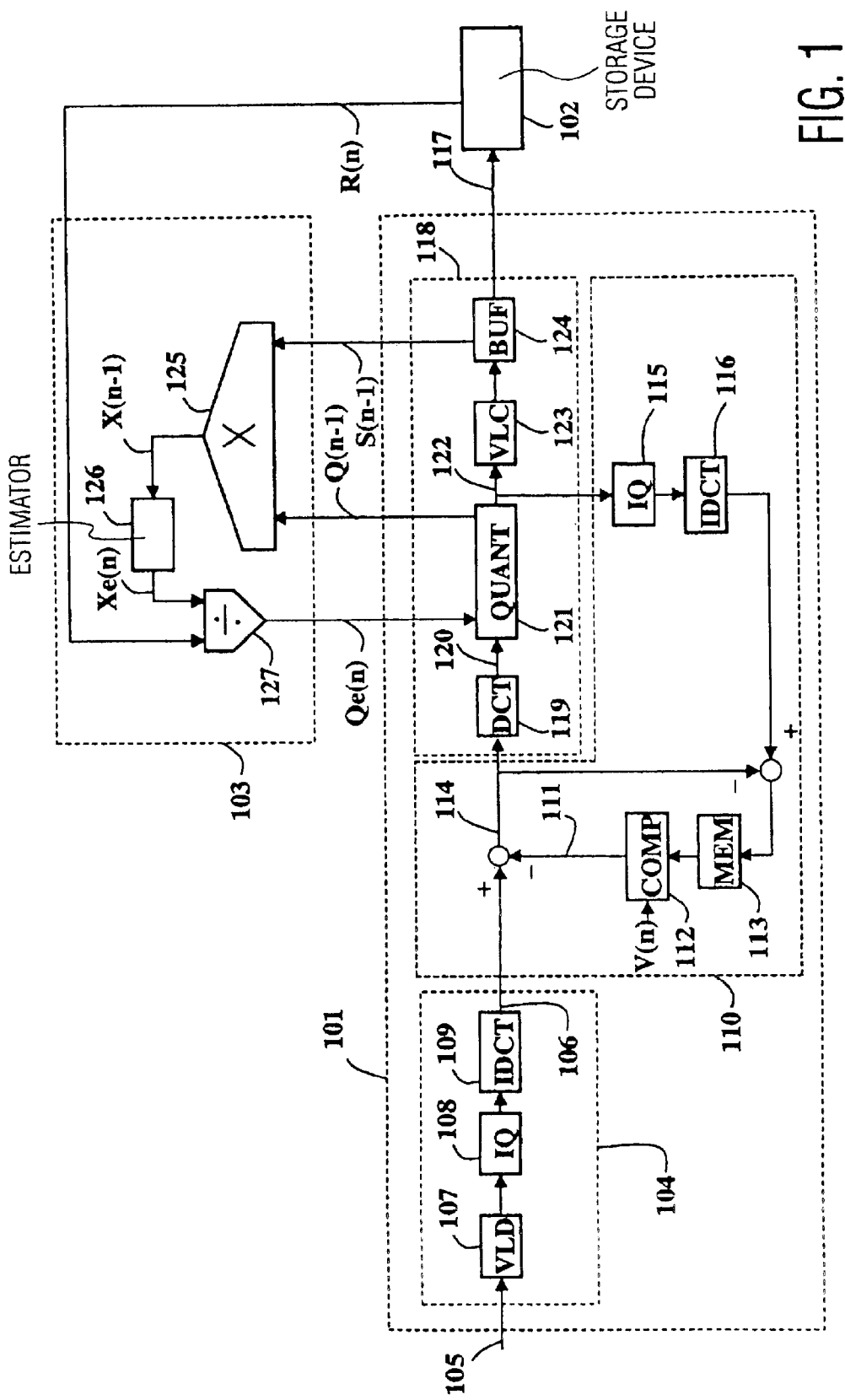

The present invention relates to a video bitrate control method for a video coding system, said coding system generating coded video frames stored in a storage device and originating from a sequence of input frames, said method comprising at least a quantization step for applying a quantization factor to said input frames.

This invention may be used in video coding systems, such as MPEG-2 video encoders or transcoders.

BACKGROUND OF THE INVENTION

The MPEG-2 video compression standard (Moving Pictures Experts Group), referred to as ISO/IEC 13818-2, is not only used for broadcasting applications but also for recording applications. This standard is indeed used for generating compressed video sequences to be stored on digital a video disc (DVD). To this end, many techniques can be envisaged. One consists of encoding input frames so that the resulting output signal containing MPEG-2 encoded frames has a constant bit rate (CBR). Another one consists of encoding input frames so that the resulting output signal has a variable bit rate (VBR). The first approach is very convenient since the storing of encoded video frames on a space-limited storage device is guaranteed, but it is to the detriment of video quality, which may fluctuate because input frames do not require the same amount of bits in dependence on their complexity. The second approach ensures a fairly constant quality of the overall encoded frames because the amount of bits allocated increases with frame complexity. However, the control of this process does not allow a prediction of the amount of bits generated, which is not fixed, and as a consequence the storing of said encoded frames on a space-limited storage device is not guaranteed and may lead to large bit overflows and underflows.

The international patent application WO 99/49664 describes a method of regulating the bitrate of encoded video frames to a constant overall value, but resulting in a locally variable output bitrate. To this end, a target bitrate is determined for successive sets of frames to be encoded in view of determining a target encoding quality. The target bitrate is derived from differences between previous and actual target bitrates. The actual target is made variable according to the scene complexity and to the target encoding quality of each set of frames.

SUMMARY OF THE INVENTION

It is an object of the invention to propose an improved video bitrate control method allowing the storing of a compressed sequence of frames at constant quality on a space-limited storage device.

The method proposed in the prior art has functional limitations when it is used in the coding of a sequence of video frames on a space-limited storage device.

First, problems may occur at the end of the sequence encoding if the output VBR fluctuates with large amplitude. In this case, the bitrate allocation for the remaining frames to be encoded becomes hazardous, leading to a probable overflow or underflow of the storage device capacity. As a consequence, the optimal convergence of frame storing is not always guaranteed, e.g. all the frames contained in the input sequence cannot be stored.

Secondly, the constant quality of the encoded frames claimed by this method is not always guaranteed. Indeed, the target encoding quality is modified on the basis of differences between a current bitrate target and a bitrate target relative to a previous set of frames. Since at a given bitrate target a same quality is not obtained, depending on whether the frame complexity is low or high, the change of the target encoding may oscillate, leading to local temporary visual quality fluctuations.

The method according to the invention aims to provide a solution to the limitations of the prior art method. To this end, the method according to the invention is characterized in that the evaluation of the quantization factor comprises:

a calculation sub-step for calculating the previous coded frame complexity $X(n-1)$ from its quantization factor $Q(n-1)$ and its frame size $S(n-1)$, a first estimation sub-step for estimating the current input frame complexity $Xe(n)$ from at least the complexity $X(n-1)$, a second estimation sub-step for estimating the frame size $R(n)$ of the current input frame after coding from the number of bits available on the storage device and the remaining number of frames to code in the input sequence, and a third estimation sub-step for estimating the quantization factor to be applied to the current input frame from the current input frame complexity $Xe(n)$ and the estimated frame size $R(n)$.

This method allows the system to obtain a constant quality for coded frames of the sequence. It takes into consideration statistics of previous coded frames in order to evaluate a complexity of the current frame to be coded. This evaluation is characterized in that it is performed by a mechanism including a time constant so that the estimated complexity is smoothed along coded frames. In parallel, a current bit target for the frame being coded is estimated in relation to the remaining space available on the storage device and the remaining number of frames to be coded. Then, on the basis of the estimated complexity and the estimated current bit target, a quantizer step is derived and used for quantifying discrete cosine transform (DCT) coefficients defining the frame being coded. As a consequence, this quantizer step has smoothed relative variations among frames, which results in an output bitrate relative to coded frames having a VBR behavior, and leads to a constant or slowly varying quality of the coded video frames.

This method is also characterized in that the time constant is a function of the number of coded video frames on the storage device and the remaining number of video frames to be coded in the sequence.

This allows controlled variations of the output bitrate relative to coded frames, mainly at the beginning and at the end of the sequence coding. Thus, the bitrate is controlled for varying from a CBR to a VBR behavior in view of a coding parameters setting, and from a VBR to a CBR behavior for ensuring the storage of all frames of the input sequence on the storage device. Such transitory states, based on the variation of the time constant value with respect to the rank of the current frame in the sequence, corresponds to constrained VBR behavior changes guaranteeing optimal filling of the storage device in terms of quality and space. Of course, this method allows obtaining a VBR behavior during the coding processing.

BRIEF DESCRIPTION OF THE EMBODIMENTS

Figure 2:
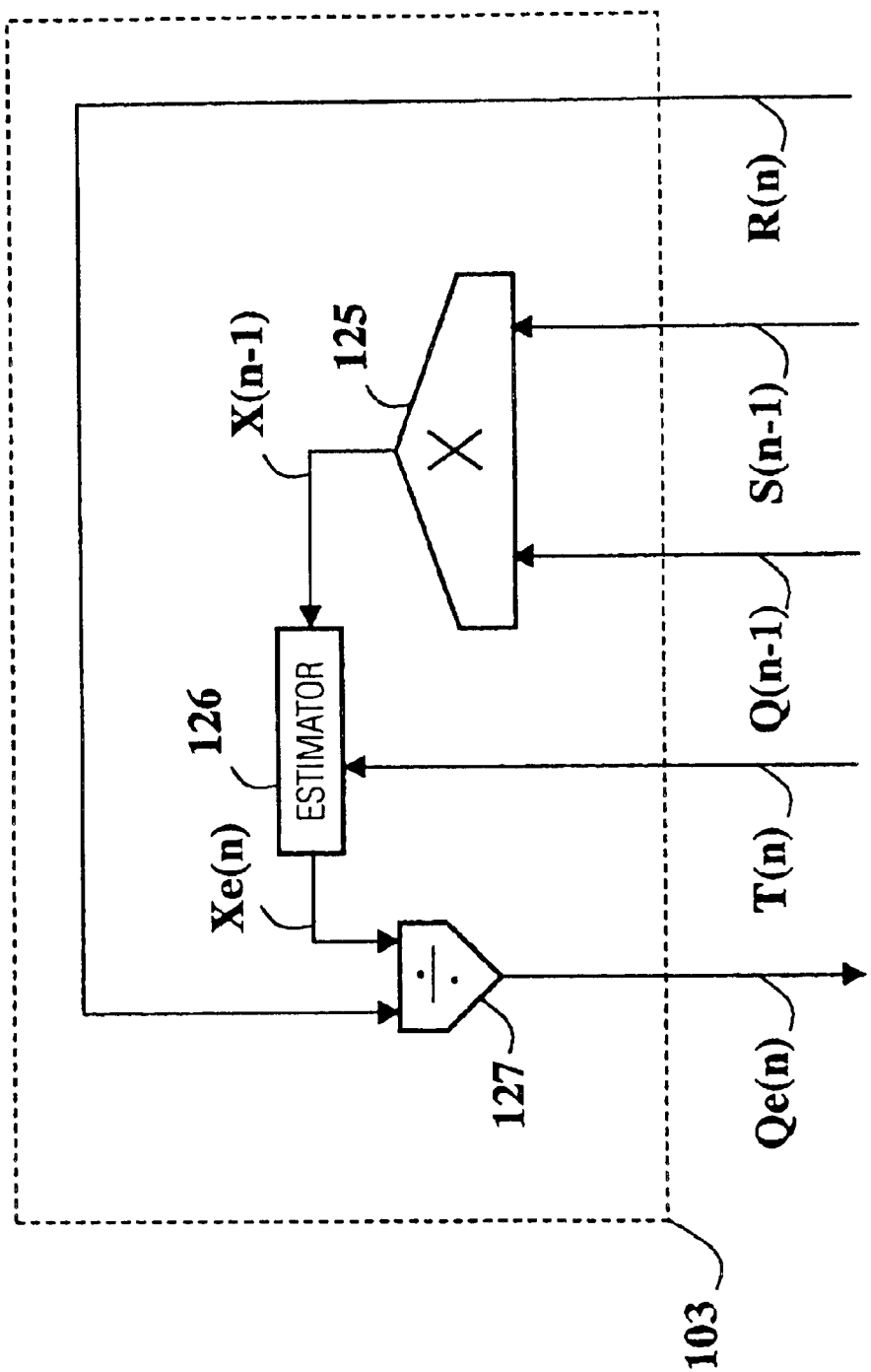

The particular aspects of the invention will now be explained with reference to the embodiments described hereinafter and considered in connection with the accompanying drawings, in which identical parts or sub-steps are designated in the same manner:

FIG. 1 depicts the method according to the invention in the context of an MPEG-2 video compressed signal transcoding, FIG. 2 depicts the bitrate control steps according to the invention, FIG. 3 gives an example of the bitrate control obtained according to the invention.

DETAILED DESCRIPTION OF THE INVENTION

The present invention relates to an improved video bitrate control method allowing the storing of a compressed sequence of frames at constant quality on a space-limited storage device.

The invention may be implemented in any video coding system where a rate control strategy is needed and used for regulating the output quality of the resulting coded frames. For example, the invention may ideally be used for supervising the quantization step of a video encoding system or a video transcoding system. It is described for the case of a MPEG-2 video transcoding system, but it would be apparent to a person skilled in the art that the scope of the invention is not limited to this specific case but may cover any block-based video coding standard such as MPEG-4 or H.263 standards.

FIG. 1 depicts the method according to the invention in the context of an MPEG-2 video compressed signal transcoding. The transcoding performs a bitrate reduction of the input signal to obtain an output signal having a lower bitrate, said output signal being stored on a space-limited storage device. This figure comprises three sets of processing steps constituting the transcoding steps 101, a storing step 102, and bitrate control steps 103 according to the invention.

The set relative to the transcoding steps 101 comprises:

- a residue decoding branch 104 receiving an input compressed video signal 105 comprising a plurality of compressed data frames and providing a decoded data signal 106. This branch comprises in series a variable length decoding 107 (VLD) for providing decoded DCT coefficients, an inverse quantization 108 (IQ) for providing dequantized DCT coefficients, and an inverse discrete cosine transform 109 (IDCT) for providing the decoded signal 106;.
- a motion compensation branch 110 for generating a motion compensated signal 111 to be subtracted from signal 106 for composing signal 114. A motion compensation 112 is achieved with the use of motion vectors V(n) relative to the current frame being transcoded and contained in the input signal 105. This motion compensation is applied to a frame signal stored in memory 113 corresponding to a coding error of the previous processed frame. This coding error is obtained after subtraction of signal 114 from a signal obtained after an inverse quantization 115 and an inverse DCT 116 applied to the output quantized signal 122. The branch 110 avoids the quality drift in the output transcoded signal 117;
- an encoding branch 118 for obtaining the output transcoded and compressed output video signal 117 from signal 114. It comprises a DCT 119 for providing a frequential signal 120 formed by DCT coefficients, a quantization 121 (QUANT) for providing signal 122 composed with quantized DCT coefficients, and a variable length coding 123 (VLC) for generating variable length coded DCT coefficients stored in a buffer 124 before being sent as signal 117 and stored in the storage device 102.

The set 103 relative to bitrate control steps is linked to sets 101 and 102 for controlling the output bitrate of signal 117 for ensuring a constant quality of the signal 117 and an optimal filling on the storage device 102. To this end, the set 103 uses coding and storing statistics of the previous transcoded frames to determine the more suitable value of the quantization factor used in step 121 when the current frame is transcoded. This bitrate control is based on the principle that the evaluation of the quantization factor value can be derived from the ratio between the frame complexity and the frame size of a compressed frame.

Thus, in a first step 125, the average quantization factor value Q(n−1) relating to the previous transcoded frame is multiplied by the frame size S(n−1) of said previous transcoded frame, resulting in the complexity X(n−1) relating to the previous transcoded frame. The frame size S(n−1) is expressed in bits and is calculated when the previous transcoded frame is temporarily stored in the buffer 124.

In a second step 126, the current frame complexity Xe(n) to be transcoded is estimated from the calculated previous transcoded frame complexity X(n−1). Many techniques, further described in the following paragraphs, may be used for evaluating Xe(n), for example using a weighted average of frame complexities relative to previous transcoded frames. In parallel to the current frame complexity estimation, the current frame size R(n) is estimated from storing statistics of step 102. The frame size R(n), expressed in bits, is thus calculated as follows:

$$R(n)=\text{Remaining\_bits}/(\text{Remaining\_pics}+\text{Margin\_pics}) \quad (\text{eq.1})$$

with variable Remaining_bits corresponding to the number of bits spaces remaining unfilled on the storage device, with variable Remaining_pics corresponding to the number of frames remaining to be transcoded in the sequence and to be recorded on the storage device, with Margin_pics corresponding to a number of frames verifying Margin_pics ≧0.

This estimation allows the system to target an average frame size for the transcoding of the current frame by taking into account the storage occupancy of the storage device and the number of frames in the input sequence not transcoded yet. It is a key characteristic for ensuring an optimal storing of all frames of the input sequence. The variable Margin_pics, if set to a positive non-zero value and allows to favor a small underflow rather than an overflow of the storage capacity, which is preferable when dealing with successive frames having rather different complexities.

In a third step 127, the ratio between the estimated complexity Xe(n) and the estimated frame size R(n) is calculated so as to obtain an estimated quantization factor Qe(n). This step 121 consists in dividing each DCT coefficient contained in signal 120 by the current input frame being transcoded by Qe(n), the result of said division being rounded to the nearest integer to define quantized DCT coefficients which constitute the signal 122. However, the quantization factor used for quantizing DCT coefficients may differ slightly from the estimated value Qe(n). This may be the case in the following scenarios:

Qe(n) is rounded to the nearest value allowed by the granularity of the MPEG-2 quantization scale, an adaptive quantization is performed, consisting in changing locally the quantization factor to be adapted to the local frame complexity, the estimated Qe(n) is changed in accordance with the type of the frame being transcoded, e.g. in multiplying Qe(n) by a factor 1.4 for B-frames and a factor 1.0 for P-frames and I-frames, if Qe(n) exceeds the value of the quantization factor with which the input frame has been quantized, it is set to said value.

FIG. 2 depicts the rate control strategy set 103 according to the invention. This rate control aims at delivering an estimation of the quantization factor Qe(n) for the current frame number n to be transcoded with respect to statistics Q(n−1), S(n−1) and R(n). To this end, as previously explained FIG. 1, an estimation 126 of the complexity Xe(n) relating to the current frame is performed on the basis of the complexity X(n−1) relating to the previous transcoded frame. This estimation 126 uses an adjustable forgetting factor T(n) as an input which allows to adjust the reaction speed of the estimation. This estimation is done according to the following equation:

$$Xe(n)=(1-T(n))Xe(n-1)+T(n)X(n-1) \quad \text{(eq.2)}$$

with $0<T(n)<1$

Eq.2 corresponds to the equation of a first order recursive filter implying the complexity X(n−1) and the complexity Xe(n−1) relating to the previous frame transcoded. This estimation is characterized by its time constant defined as the duration, expressed in the number of frames or samples, necessary for obtaining an amplitude of Xe equal to 66% of the amplitude of a unity step signal X. In the case of eq.2, the time constant, noted $\tau$, is given by:

$$\tau=1/(2.T) \quad \text{(eq.3)}$$

The time constant is directly dependent on the forgetting factor T, which factor has a constant value or varies with the rank of the frame being transcoded in the sequence. If $\tau$ is set such that $\tau \gg 1$, the complexity Xe(n) does not vary much from one estimation to the next. In other words, the complexity Xe(n) is close to the complexity Xe(n−1). Thus the estimated quantization factor Qe(n) is close to the quantization factor Qe(n−1), which means that a constant quality is obtained for frames having ranks n and n−1. As a consequence, the bitrate of signal 117 resulting from the quantization 121 performed with a constant quantization factor has a VBR behavior. If $\tau$ is set to a small number of frames, Xe may vary in large proportions, resulting in successive quantization factors having large differences, which will lead to a CBR behavior of the output bitrate of signal 117.

Another aspect of the invention consists in defining a variation scheme for the time constant $\tau$ used in the complexity estimation step 126. This variation scheme allows obtaining a controlled CBR behavior of signal 117 at the beginning and at the end of the sequence transcoding to ensure that all the space available on the storage device is used, without overflows or underflows. This variation scheme also allows switching from a CBR to a VBR behaviour in increasing the time constant $\tau$ in order to obtain a comparatively constant quality of transcoded frames. The time constant $\tau$ is restricted to a variation range defined as follows.

First, to make sure that the storage capacity is met at the end of the transcoding, $\tau$ must comply with:

$$\tau \leq \text{Remaining\_pics} \quad \text{(eq.4)}$$

Moreover, $\tau$ must be larger than the number GOP_size of frames contained in a group of pictures (GOP) or a group of frames:

$$\tau \geq \text{GOP\_size} \quad \text{(eq.5)}$$

This allows to smooth the estimated complexity of the input frames to be transcoded over at least GOP_size frames, and not to take into account the individual bit allocation characteristics to said input frames.

The estimated complexity Xe(n), although derived from complexities relating to previous transcoded frames, does not have to be derived from too old complexities. To this end, $\tau$ must comply with:

$$\tau \leq \text{Max\_time} \quad \text{(eq.6)}$$

Thus, the estimation of the current complexity Xe(n) mainly depends on the complexities relative to the Max_time previous transcoded frames, which allows a slow adaptation of the complexity estimation for the current scene of the sequence in a sliding manner.

The estimation of the quantization factor Qe(n) is performed periodically. For example, it may be performed with the frame cycle frequency, implying also an update of R(n), Q(n−1), S(n−1) and Xe(n) at the same time. In an alternative configuration, if the input video signal has a GOP structure, e.g. each GOP being identified by an INTRA frame, Qe(n) may be updated with a GOP frequency so that the estimated value Qe(n) is highly smoothed and the processing load reduced. Otherwise, if no GOP structure can be identified in the input video signal, the update of R(n), Q(n−1), S(n−1) and Xe(n) is performed in an arbitrary cycle of 0.5 second at the maximum each time, which corresponds to the recommended GOP duration in a broadcast context.

Figure 3C:
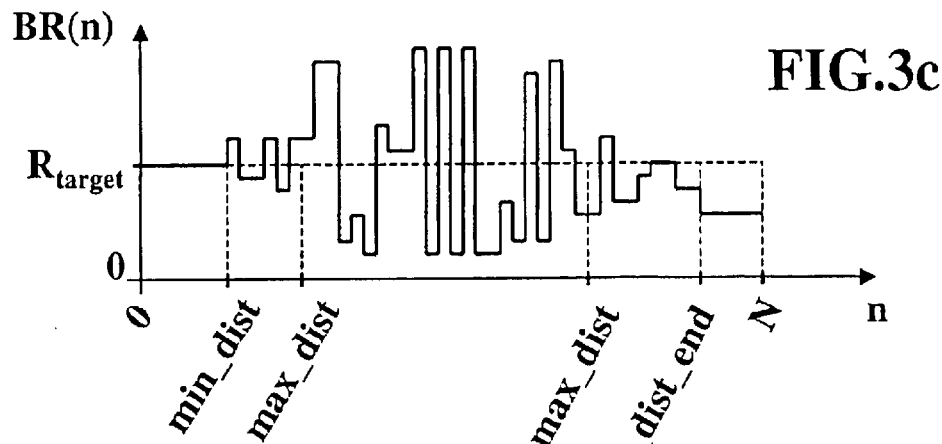
Figure 3B:
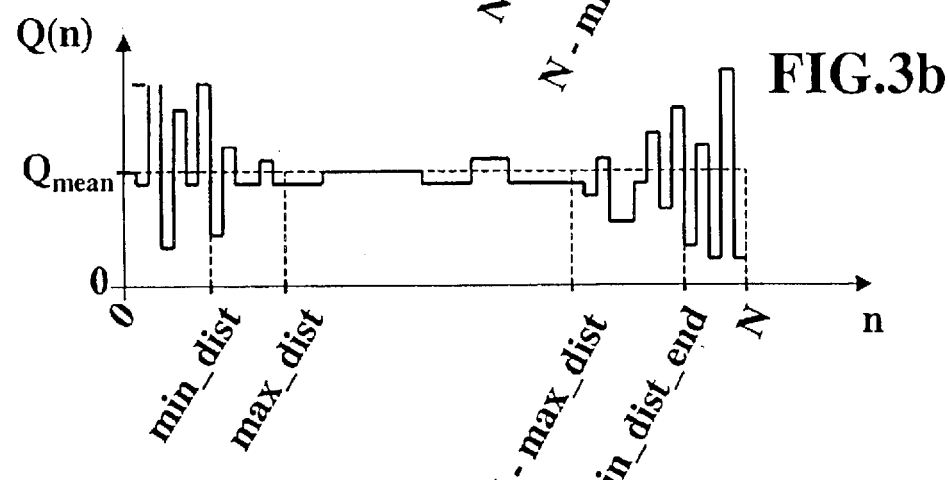
Figure 3A:
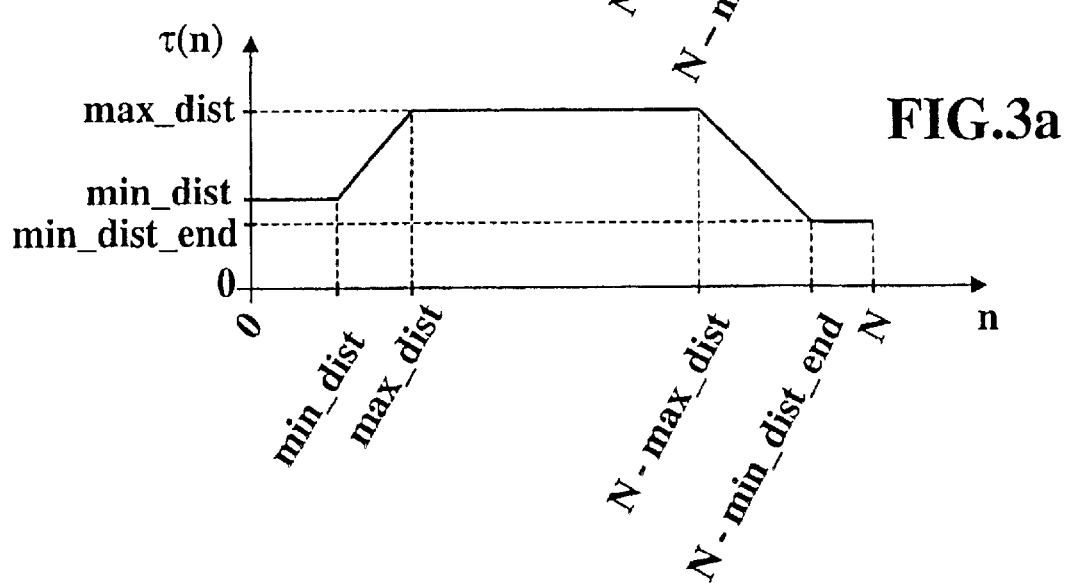

FIG. 3 gives an example of the time constant variations described in sub-FIG. 3a used for estimating the complexity Xe(n), and shows the resulting variations described in sub-FIG. 3b of the quantization factor Q used for quantizing DCT coefficients relating to signal 120, and the variations described in sub-FIG. 3c of the resulting output bitrate of signal 117, in the context of a transcoding as described in FIG. 1. The horizontal axis of each figure corresponds to the rank of the frames in the sequence comprising a total of N frames. Five distinct ranges can be considered, depending on the frame rank n:

0<n<min_dist: This range corresponds to the beginning of the transcoding. The time constant $\tau$ is set to a constant small value in order to obtain a CBR behavior of signal 117. It holds that verifies $\tau(n)$=min_dist. This range allows to set coding parameters such as the set of previous complexities X(n−1) from which the complexity Xe(n) is deduced. Typically, min_dist is set such that the duration of this range is about one minute. The quantization factor Q(n) fluctuates highly, reflecting the fact that if a CBR is indirectly imposed, strong or small quantizations are necessary to compensate for frame complexity variations.

min_dist<n<max_dist: This range is a transitory state where $\tau$ complies with $\tau(n)$=n. The time constant is increased with the frame rank, so that the output bitrate of signal 117 varies slowly from a CBR to a VBR behavior. In other words, this state corresponds to a constrained VBR control regulation. As can be seen in FIG. 3b, the quantization factor Q(n) has fluctuations of decreasing amplitudes, which results in a more constant quality of transcoded frames. Typically, max_dist is set such that the duration from moment 0 is a few minutes.

max_dist<n<N−max_dist: This range corresponds to the transcoding of input frames in imposing a time constant for which $\tau(n)$=max_dist. This large time constant allows to obtain a comparatively constant quality of transcoded frames because the quantization Q(n) has limited variations around an average value $Q_{mean}$. It results in a VBR behavior of the output signal 117.

N-max_dist<n<N-min_dist_end: This range is a transitory state where τ complies with τ(n)=N-n. The time constant is decreased as the frame rank increases, so that the output signal 117 slowly varies from a VBR to a CBR behavior. The quantization factor Q(n) has fluctuations of increasing amplitudes, which results in a more variable quality of transcoded frames.

N-min_dist_end<n<N: This range corresponds to the end of the transcoding. The time constant τ is set to a constant small value in order to obtain a CBR behavior of signal 117. It holds that τ(n)=min_dist_end. This CBR behavior allows to obtain an optimal filling of the space-limited storage device because the bitrate is targeted in taking into account the remaining frames to be transcoded in the sequence and the space available on said storage device. Typically, min_dist_end is set such that the duration of this range is about one minute.

Of course, the above example relating to the variation scheme of the time constant τ is not exhaustive and alternative schemes may be applied without deviating from the scope of this invention. For example, the range between 0 and max_dist may be suppressed in order to start the quantization with a large time constant, resulting in a VBR behavior of the output signal 117 right from the beginning.

This invention can be implemented in several manners, such as by means of wired electronic circuits or, alternatively, by means of a set of instructions stored in a computer-readable medium, said instructions replacing at least part of said circuits and being executable under the control of a computer or a digital processor in order to carry out the same functions as fulfilled in said replaced circuits. The invention then also relates to a computer-readable medium comprising a software module that includes computer executable instructions for performing the steps, or some steps, of the method described above.

It is obvious that the verb "code" relates to any video signal data manipulation performed in the digital domain. In particular, this verb applies to both encoding and transcoding methods.

What is claimed is:

1. A video bitrate control method for a video coding system generating coded video frames to be stored on a storage device from a sequence of input frames, said method comprising at least a quantization step for applying to said input frames a quantization factor issued from an evaluation step, said method being characterized in that said evaluation step comprises:

a calculation sub-step for calculating a previous coded frame complexity X(n-1) from a quantization factor Q(n-1) and a frame size S(n-1) relative to a previous coded frame, a first estimation sub-step for estimating of a current input frame complexity Xe(n) from the complexity X(n-1), a second estimation sub-step for estimating a frame size R(n) relative to a current input frame after coding from the number of bits still available on the storage device and the remaining number of frames to be coded in the input sequence, a third estimation sub-step for estimating the quantization factor to apply to the current input frame from the current input frame complexity Xe(n) and the estimated frame size R(n).

2. A method as claimed in claim 1, characterized in that the first estimation sub-step is done by a filter including a time constant.

3. A method as claimed in claim 2, characterized in that the time constant is a function of the number of video frames already coded and the remaining number of video frames not yet coded in the sequence.

4. A method as claimed in claim 3, characterized in that a temporal evolution of a time constant τ(n) is given by the following relations:

if(0<n<min_dist)
    then τ(n)=min_dist;
if(min_dist<n<max_dist)
    then τ(n)=n;
if(max_dist<n<N-max_dist)
    then τ(n)=max_dist;
if(N-max_dist<n<N-min_dist_end)
    then τ(n)=N-n;
if(N-min_dist_end<n<N)
    then τ(n)=min_dist_end;

where min_dist_end, min_dist and max_dist are thresholds of increasing value, n is the current frame number being coded in the sequence, and N the total number of frames in the sequence.

5. A method as claimed in claim 1, characterized in that the complexity Xe(n) is updated periodically.

6. A video encoding device allowing to implement a video bitrate control method as claimed in claim 1.

7. A video transcoding device allowing to implement a coding video bitrate control method as claimed in claim 1.

8. A computer program product, for an encoding device generating output encoded frames from input non-encoded frames, which product comprises a set of instructions which, when loaded into said device, causes said device to carry out the method as claimed in claim 1.

9. A computer program product, for a transcoding device generating output encoded frames from input encoded frames, which product comprises a set of instructions which, when loaded into said device, causes said device to carry out the method as claimed in claim 1.

* * * * *